Nov. 8, 1955  A. J. METZ  2,722,782
BLADE GRINDER HEAD
Filed April 21, 1954

INVENTOR.
ANTHONY J. METZ
BY
Merrill M. Blackburn
ATTORNEY

United States Patent Office 2,722,782
Patented Nov. 8, 1955

2,722,782
BLADE GRINDER HEAD

Anthony J. Metz, Davenport, Iowa, assignor to Bettendorf Bakery Equipment Company, Bettendorf, Iowa, a corporation of Iowa Application April 21, 1954, Serial No. 424,591

7 Claims. (Cl. 51—98)

The present invention relates to the bread-slicing art and more particularly to the grinding of blades during the making and sharpening of blades which, in the bread slicing art, are usually of the endless band type. In the art of making and sharpening blades for bread slicing machines, it is generally known to prepare blades with scalloped edges by moving the blade, while held in a suitable head, toward and away from the grinding wheel to produce the scallop, and, then, to advance the blade to the next tooth, but this invention pertains to a new head for holding blades during the sharpening and spacing operations.

In the drawings annexed hereto and forming a part hereof,

Figure 2:
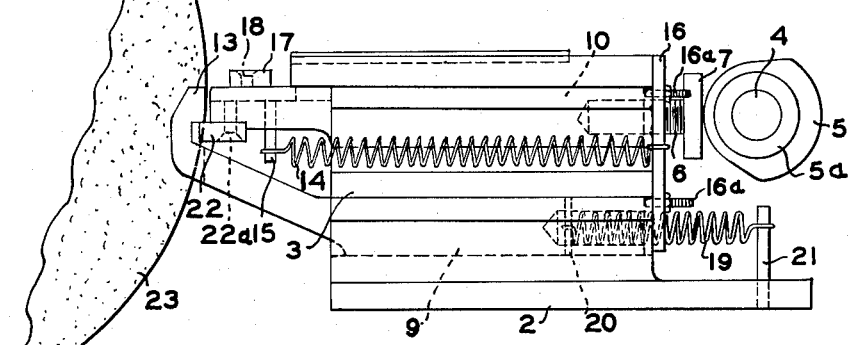
Fig. 2 is a side view of the structure shown in Fig. 1.

Reference will now be made in greater detail to the annexed drawings for a more complete description of this invention. A base 1 has a block 2 secured to the upper side thereof, and the block 2 has a block 3 secured thereto by bolts 2a. Longitudinally extending grooves 3a and 3b are formed in the upper faces of the blocks 2 and 3. A shaft 4 bearing a cam 5 is mounted in bearings, not shown, and may be rotated. As the shaft 4 rotates, the cam 5 rotates and forces a screw 6, provided with a wear head 7, forwardly. The block 2 has, in its upper surface, a V-shaped groove in which lies a triangular block or slide 9, actuated in one direction by a triangular block 10 which pushes blade-engaging members 11 forwardly, and these push a blade 12 to cause it to engage anvils 13 which yield under the pressure of the block 10 which is moved forwardly by the cam 5 acting through the screw 6 and the wear head 7. When the cam 5 turns around so that the lower part of the cam engages the wear head 7, the block 10 is pulled backwardly by a spring 14, engaging at one end a pin 15 and, at the other end, engaging a plate 16. The plate 16 is attached in any suitable way, not shown, to the blocks 2 and 3, and is in line with the slides 9 and 10, the plate 16 carrying adjustable stops 16a which limit the movement of the slides 9 and 10 under the influence of the springs 14 and 19. As shown in Fig. 2, the anvils 13 are connected to the triangular block 9. The movement of the block 9 is only a small part of an inch, and this movement is caused by the forward motion of the sliding block 10, since the latter acts through the blade-engaging members 11 and the blade 12 to move the anvils 13, the latter being attached to the lower block 9.

A cross-bar 17 is held down by a screw 18, screwed into the slidable block 10, and the cross-bar 17 has slight projections on the underside, engaging the blade-engaging members 11, slidably, so that the blade-engaging members 11 can move with the slidable block 10. The cross-bar 17 holds the blade-engaging members 11 adjustable so that they insure proper positioning of the blade and compensate for wear as the blade-engaging members 11 are ground down in forming the teeth on the blade 12. Anvils 13 are retracted by a spring 19, secured at one end to a pin 20 and at its other end to a pin 21 secured to the base of the block 2, as best shown in Fig. 2. The blade 12 rests on a wear strip 22, secured to the block 10 by screws 22a.

Figure 1:
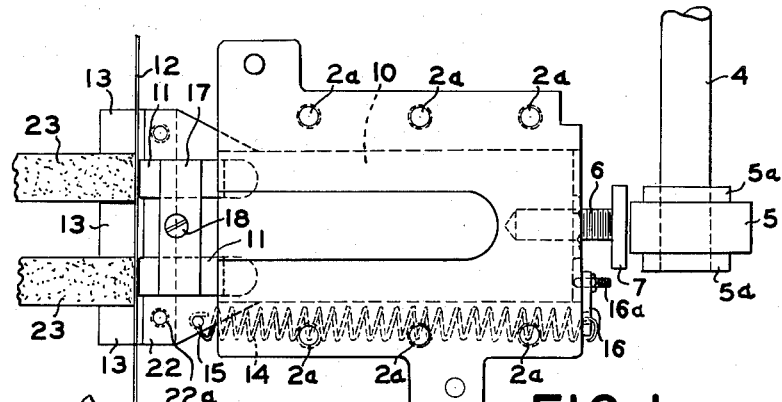
Fig. 1 is a plan view of the head with a part removed.
Figure 3:
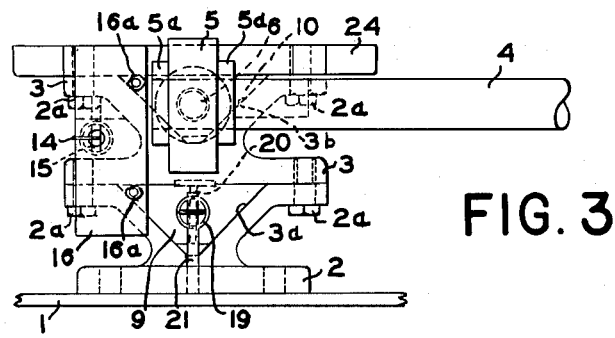
Fig. 3 is a side view of the structure shown in Fig. 2, looking at the right side of that figure.

The head 7 is hidden from view in Fig. 3 by the cam 5 and bosses 5a, the shaft 4 being horizontal and the cam 5 vertical. The block 10 is channeled for the reception of the blade-engaging members 11. Between the anvils 13 are the grinding wheels 23. A top plate 24 is connected to the block 3 by screws 2a, similarly as the blocks 2 and 3 are connected. The grinding wheels are surface shaped or contoured to give the desired shape to the scallops in the blades. In the particular example of the invention chosen here for illustration, the grinding wheels 23 are cylindrical, as shown in Fig. 1. Since the blade 12 is presented to these wheels at substantially a tangent to said wheels, the wheels will grind generally rectangular notches or scallops in the blades. If the "corners" of the wheels are rounded, each scallop will have a rounded corner or fillet. Likewise, if the wheel has any other shape or contour it will be reflected in the shape of the scallop. Wheels other than cylindrical are conventionally known in the art as "formed" wheels, the shapes of which are conventionally achieved and varied by any well-known type of diamond dresser. This is offered here only by way of explanation, since the present invention is not at all limited to the forming of any particular shape of scallop.

It is of course understood that the specific description of structure set forth above may be departed from without departing from the spirit of this invention as disclosed in this specification and as defined by the appended claims.

Having now described my invention, I claim:

1. A blade grinder comprising a composite head formed from a pair of blocks having V-shaped grooves in their upper surfaces, a triangular block in the groove in the upper surface of the lower block and slidable longitudinally thereof, an anchor at one end of said groove, the two blocks with V-shaped grooves being secured together with a groove between them, an anchor within the triangular block in the groove in the lower of said blocks having V-shaped grooves in their upper surfaces, the slidable block in the lower block having anvils at its forward end, a spring connecting the two anchors and retracting the anvils, the second grooved block having a triangular block slidable in the groove in its upper surface, an anchor at one end of the second grooved block, a pin connected to the second triangular block, and a spring connecting the second named triangular block with the anchor at the end of said triangular block whereby the second triangular block may be retracted.

2. A structure as defined by claim 1 having blade-holding members slidable with respect to the second block with a V-shaped groove, and means for moving the blade-holding members forwardly into blade-holding position.

3. A blade-holding block having at one end thereof a shaft on which is mounted a cam, said block being a composite block of which the separate parts are similar and having V-shaped grooves in the upper surfaces thereof, the two blocks being secured together and having relatively slidable blocks in the grooves, a spring connected to urge each of said two slidable blocks in one direction, blade-receiving means on one of said slidable blocks, the other of said slidable blocks being moved in the opposite direction by said cam.

4. A structure as defined by claim 3 having blade-grinding wheels mounted adjacent the slidable blocks whereby the blades can be ground when both slidable blocks are moved, with a blade therebetween, toward the grinding wheels.

5. A blade-holding block for the grinding of bread slicer blades, comprising a pair of channeled members, the channels being separated and said members being secured together, the channels having therein slidable blocks, a cam mounted at one end of the blade-holding block and, upon rotation, causing one of the slidable blocks to advance to holding position, and means on the other block to receive a slicer blade in a position to be engaged by said one block when the latter is advanced, movement of said one block, after the blade is held between said blocks, causing the other slidable block to be advanced slightly so that the two slidable blocks are caused to present the blades in grinding position.

6. A holder for blades of a band blade machine having a support, a channeled block on said support, said block having a V-shaped groove in the upper surface thereof, a similar channeled block on the first block, a triangular block slidable in the V-shaped groove, a second triangular block in the V-shaped groove of the channel on the second block, a spring in the V-shaped groove of the first block, connected to the triangular block therein, an abutment at the end of the block having the V-shaped groove to receive said spring, anvils on the end of the first triangular block to be drawn into engagement with a blade to be ground, a spring to withdraw the second triangular block, blade-holding members connected with the second triangular block, a cam adapted to engage and force the second triangular block forwardly into blade-holding position, movement of the second triangular block being adapted to force the anvils forwardly into grinding position when the second block is forced forwardly by the cam, and means to operate said cam.

7. A blade holder for a band blade grinding machine, comprising two blocks secured together, the upper base block having a substantially flat face presented toward the other block, said blocks having V-shaped grooves in the upper faces thereof, there being triangular blocks in the V-shaped grooves in the base blocks, said triangular blocks being slidable lengthwise of the grooves, a spring connected to the slidable block in the lower base block to retract the slidable block therein, an extension from one end of said slidable block, said extension having anvils to cooperate in holding a blade while grinding it, a cover plate on the second mentioned block to hold the slidable block in place, a screw in the end of the second mentioned triangular block, a rotary cam adjacent the screw and adapted to contact the latter for advancing the block and blade-engaging members adjacent the anvils, to cooperate with the anvils in grinding blades.

References Cited in the file of this patent

UNITED STATES PATENTS 2,160,378     Balsiger _____ May 30, 1939